US011543809B2

(12) United States Patent
Kraniak et al.

(10) Patent No.: US 11,543,809 B2
(45) Date of Patent: Jan. 3, 2023

(54) AUTOMATED INSPECTION PROGRAM GENERATION

(71) Applicant: Bell Textron Inc., Fort Worth, TX (US)

(72) Inventors: Chesley Kraniak, Arlington, TX (US); Cody Torno, Haltom City, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/333,245

(22) Filed: May 28, 2021

(65) Prior Publication Data

US 2022/0382261 A1 Dec. 1, 2022

(51) Int. Cl.
*G05B 19/418* (2006.01)

(52) U.S. Cl.
CPC .......... *G05B 19/41875* (2013.01); *G05B 2219/32368* (2013.01)

(58) Field of Classification Search
None
See application file for complete search history.

(56) References Cited

U.S. PATENT DOCUMENTS

| 5,781,450 A * | 7/1998 | Glasson | G01B 5/008 |
| | | | 700/83 |
| 7,146,291 B2 * | 12/2006 | Hough | G01B 21/04 |
| | | | 702/155 |
| 7,327,869 B2 | 2/2008 | Boyer | |
| 8,237,935 B2 | 8/2012 | Nygaard et al. | |
| 8,520,930 B2 | 8/2013 | Van Coppenolle | |
| 8,812,154 B2 | 8/2014 | Vian et al. | |
| 2009/0112357 A1 * | 4/2009 | Hammond | B33Y 40/00 |
| | | | 700/194 |
| 2013/0030773 A1 * | 1/2013 | O'Hare | G01B 21/04 |
| | | | 703/1 |
| 2014/0129503 A1 * | 5/2014 | Yang | G06N 5/02 |
| | | | 706/46 |

(Continued)

OTHER PUBLICATIONS

Kraniak, Chesley, et al.; "Automatic Generation of Object Inspections"; U.S. Appl. No. 17/333,348, filed May 28, 2021; 45 pages.

*Primary Examiner* — Jason Lin
(74) *Attorney, Agent, or Firm* — Shackelford, Bowen, McKinley & Norton, LLP (57) ABSTRACT

In an embodiment, a method of automatically generating an inspection program includes receiving input data related to an object to be inspected. The input data includes geometric dimensioning and tolerancing data for the object. The method also includes, for each of a plurality of surfaces of the object, generating at least one inspection direction and a plurality of inspection points based, at least in part, on the geometric dimensioning and tolerancing data. The method also includes generating transitional motions for an inspection machine to inspect the plurality of surfaces according to the inspection directions and the inspection points. The method also includes storing, at a destination, machine-readable code for inspecting the object according to the at least one inspection direction of each of the plurality of surfaces, the inspection points of each of the plurality of surfaces, and the transitional motions.

20 Claims, 5 Drawing Sheets

(56) References Cited

U.S. PATENT DOCUMENTS

| | | | | |
|---|---|---|---|---|
| 2015/0169790 A1* | 6/2015 | Tseo | ............... | G05B 19/41875 |
| | | | | 700/98 |
| 2017/0090742 A1* | 3/2017 | Ade | ............... | G01B 5/012 |
| 2018/0010910 A1* | 1/2018 | Dotschkal | ........ | G05B 19/40932 |
| 2018/0089360 A1* | 3/2018 | Madsen | ............... | G05B 19/401 |
| 2018/0307198 A1* | 10/2018 | Aizawa | ............. | G05B 19/4083 |
| 2018/0349518 A1* | 12/2018 | Byers | ............... | G05B 19/41875 |
| 2019/0354915 A1* | 11/2019 | Hockett | ............... | G06F 30/00 |

* cited by examiner

AUTOMATED INSPECTION PROGRAM GENERATION

CROSS-REFERENCE TO RELATED APPLICATIONS

This patent application incorporates by reference the entire disclosure of a U.S. patent application Ser. No. 17/333,348 filed on May 28, 2021.

BACKGROUND

Technical Field

The present disclosure relates generally to adaptive machining and more particularly, but not by way of limitation, to systems and methods for automated inspection program generation.

History of Related Art

Coordinate-measuring machines (CMMs) are sometimes used in manufacturing and assembly processes to test a part or assembly against the design intent. A probe is often positioned manually by an operator or automatically via Direct Computer Control (DCC). Although DCC CMMs can be programmed to measure identical parts, such programming is time-consuming, of varying quality, and highly dependent on programmer expertise.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, in an embodiment, a method of automatically generating an inspection program includes receiving input data related to an object to be inspected. The input data includes geometric dimensioning and tolerancing data for the object. The method also includes, for each of a plurality of surfaces of the object, generating at least one inspection direction and a plurality of inspection points based, at least in part, on the geometric dimensioning and tolerancing data. The method also includes generating transitional motions for an inspection machine to inspect the plurality of surfaces according to the inspection directions and the inspection points. The method also includes storing, at a destination, machine-readable code for inspecting the object according to the at least one inspection direction of each of the plurality of surfaces, the inspection points of each of the plurality of surfaces, and the transitional motions. Other embodiments of this aspect include corresponding computer systems, apparatus, and computer programs recorded on one or more computer storage devices, each configured to perform the actions of the methods.

In another general aspect, in an embodiment, a computer system includes a processor and memory. The processor and memory in combination are operable to implement a method. The method includes receiving input data related to an object to be inspected. The input data includes geometric dimensioning and tolerancing data for the object. The method also includes, for each of a plurality of surfaces of the object, generating at least one inspection direction and a plurality of inspection points based, at least in part, on the geometric dimensioning and tolerancing data. The method also includes generating transitional motions for an inspection machine to inspect the plurality of surfaces according to the inspection directions and the inspection points. The method also includes storing, at a destination, machine-readable code for inspecting the object according to the at least one inspection direction of each of the plurality of surfaces, the inspection points of each of the plurality of surfaces, and the transitional motions.

In another general aspect, in an embodiment, a computer-program product includes a non-transitory computer-usable medium having computer-readable program code embodied therein. The computer-readable program code is adapted to be executed to implement a method. The method includes receiving input data related to an object to be inspected. The input data includes geometric dimensioning and tolerancing data for the object. The method also includes, for each of a plurality of surfaces of the object, generating at least one inspection direction and a plurality of inspection points based, at least in part, on the geometric dimensioning and tolerancing data. The method also includes generating transitional motions for an inspection machine to inspect the plurality of surfaces according to the inspection directions and the inspection points. The method also includes storing, at a destination, machine-readable code for inspecting the object according to the at least one inspection direction of each of the plurality of surfaces, the inspection points of each of the plurality of surfaces, and the transitional motions.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, as used herein, the term "coupled" may include direct or indirect coupling by any means, including moving and/or non-moving mechanical connections.

Figure 1:
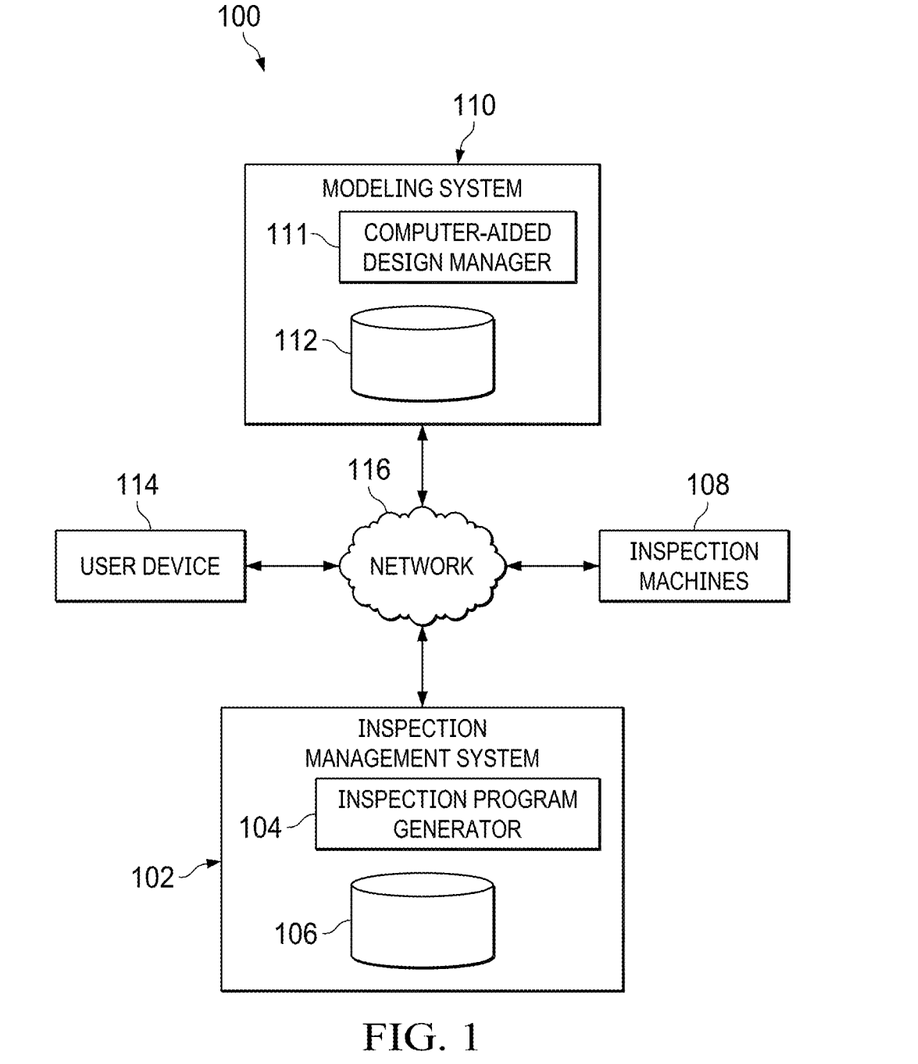
FIG. 1 illustrates an example of a computing environment for an inspection management system.

FIG. 1 illustrates an example of a computing environment 100 for an inspection management system 102. The computing environment 100 includes the inspection management system 102, inspection machines 108, a modeling system 110, and a user device 114. The inspection management system 102, the inspection machines 108, the modeling system 110, and the user device 114 are each operable to communicate over a network 116.

The network 116 can include any form of communication between components. It should be appreciated that the network 116 is intended to abstract a plurality of networks over which such communication may occur. In particular, the network 116 logically represents all communication infrastructure for connecting, for example, the inspection management system 102, to each of the user device 114, the modeling system 110 and the inspection machines 108. The network 116 can include any number of communications networks such as, for example, public or private intranets, the Internet, public switched telephone networks (PSTNs), cellular networks, satellite communication, radio communication and the like.

The user device 114 can be, or include, any type of computing device, including desktops, laptops, tablets, smartphones and wearable or body-borne computers, to name a few. Although the user device 114 is illustrated singly in FIG. 1, in various embodiments, the user device 114 can be representative of multiple devices operated by a user to interact with the inspection management system 102, the inspection machines 108 and/or the modeling system 110, inclusive of any of the foregoing example user devices. Further, in some embodiments, the user device 114 can be representative of multiple devices operated by multiple users who may have different roles in the computing environment 100. For example, different users can be involved in creating models, generating inspection programs, and/or monitoring or initiating inspection programs. For simplicity of description, the user device 114 and user thereof will be described singly, with the understanding that multiple devices and users may be involved in some cases.

In general, the inspection machines 108 are devices that programmatically examine objects to ensure that they meet specifications. The inspection machines 108 can be, for example, computer numerical control (CNC) machines, coordinating-measuring machines (CMMs), combinations of the foregoing and/or the like. In various cases, the inspection machines 108 can utilize tools, such as contact probes and non-contact lasers, that can be controllably positioned by a computer or user to execute inspections. For illustrative purposes, various examples will be described herein relative to contact probes. However, one skilled in the art will appreciate that various principles described herein are not limited to contact probes. An example of the inspection machines 108 will be described relative to FIG. 2A.

The modeling system 110 includes a computer-aided design (CAD) manager 111 and a data store 112. The CAD manager 111 can include functionality to create, modify and/or retrieve CAD models for specific objects. In a typical embodiment, the data store 112 can store CAD models for the specific objects according to any suitable structure or format, such as in a database. In various embodiments, the data store 112 can further store any data related to the CAD models represented therein as well as other data.

The inspection management system 102 includes an inspection program generator 104 and a data store 106. The inspection program generator 104 is operable to create programs that conduct inspections of objects, such as manufactured parts. In some embodiments, the inspection program generator 104 can implement an application program interface (API) that is callable, for example, by the user device 114. The data store 112 can store inspection programs, configurations for inspection programs, and/or the like. An example of automatically generating an inspection program will be described relative to FIGS. 3-4.

Figure 2A:
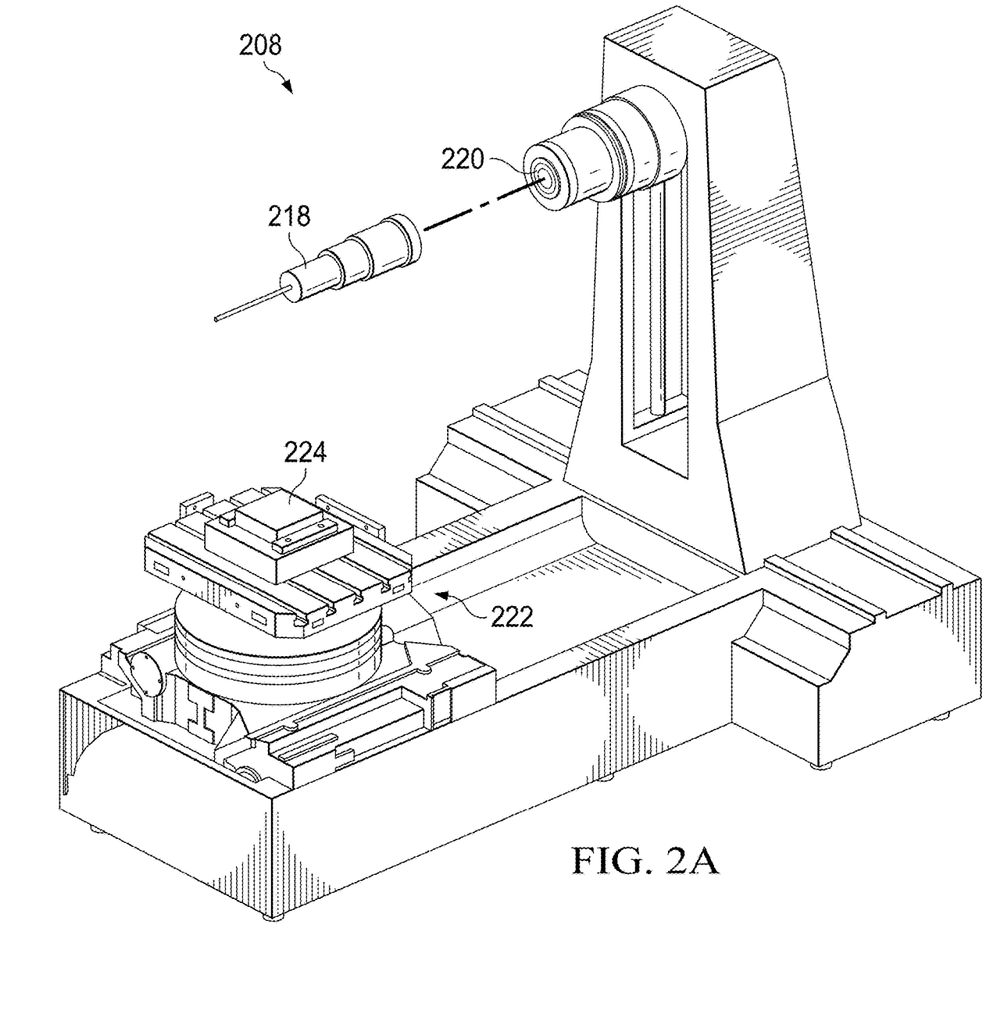
FIG. 2A illustrates an example of an inspection machine.

FIG. 2A illustrates an example of an inspection machine 208. In various embodiments, the inspection machine 208 is an example of one of the inspection machines 108 of FIG. 1. The inspection machine 208 includes a tool holder 220 and a fixture 222. The tool holder 220 is configured to receive a tool 218, such as a measurement tool or probe that is usable to measure objects. The fixture 222 serves as a support device for an object 224 that is inspected, for example, using the tool 218. The fixture 222 enables the object 224 to be securely located and/or mounted thereon. In certain embodiments, the inspection machine 208 can execute inspection programs of the type described herein. In some cases, such as in the case of certain CMMs, the fixture 222 may be omitted.

Figure 2B:
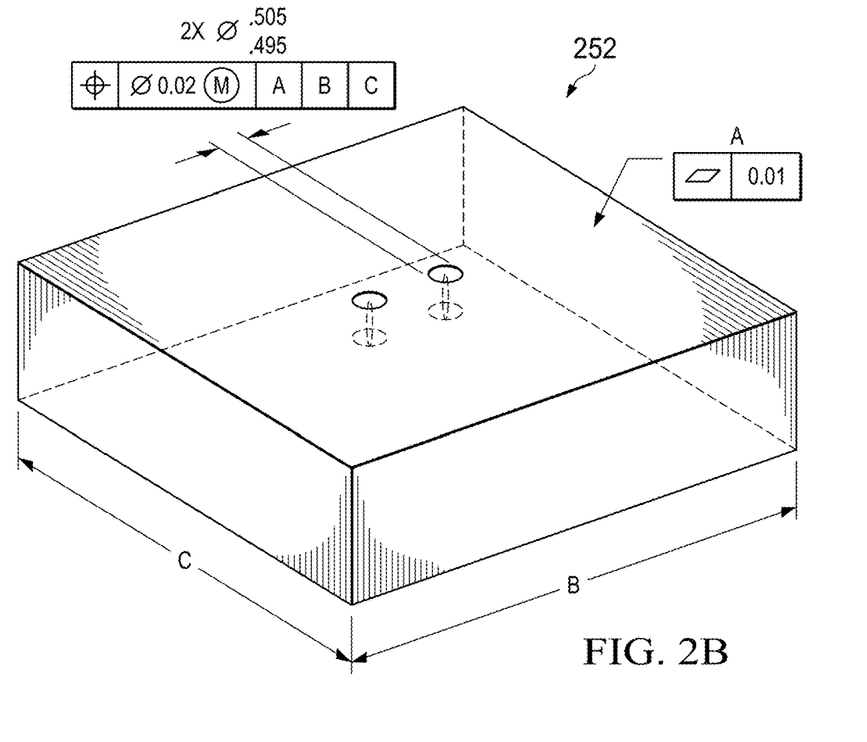
FIG. 2B illustrates an example of an object.

FIG. 2B illustrates an example of an object 252 with annotated geometric dimensioning and tolerancing (GD&T) data. In various embodiments, the annotated GD&T data can be generated by the inspection program generator 104 as will be described in greater detail relative to FIGS. 3-4.

Figure 3:
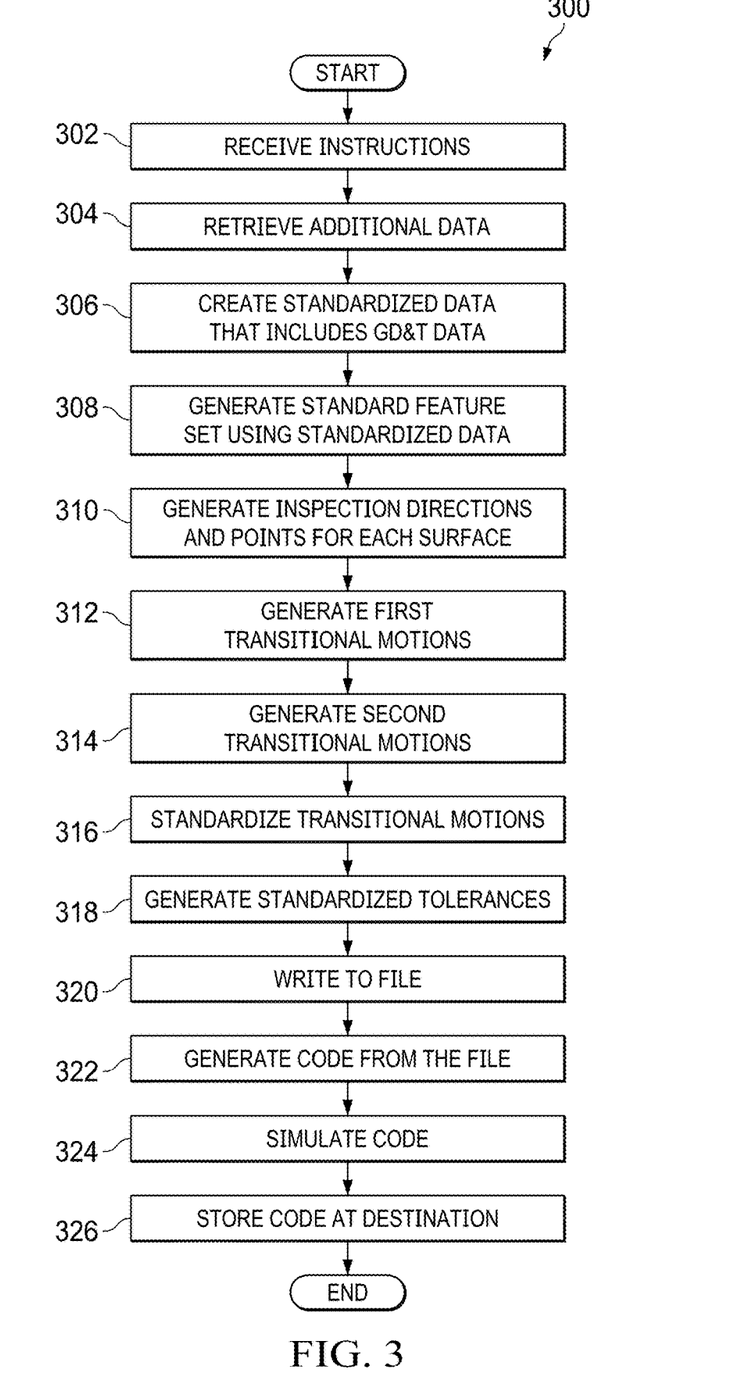
FIG. 3 illustrates an example of a process for automatically generating an inspection program.

FIG. 3 illustrates an example of a process 300 for automatically generating an inspection program. In an example, the process 300 can be executed by the inspection program generator 104 of FIG. 1. In another example, the process 300 can be executed generally by the inspection management system 102 and/or the computing environment 100. Although the process 300 can be executed by any number of different components, to simplify discussion, the process 300 will be described relative to the inspection program generator 104.

In general, blocks 302 and 304 relate to receiving input data related to an object to be inspected, such that that the input data includes geometric dimensioning and tolerancing (GD&T) data for the object. In particular, at block 302, the inspection program generator 104 receives instructions to automatically generate an inspection program for the object to be inspected. In a typical embodiment, the received instructions serve as a trigger for automatically generating the inspection program. The instructions can be received from the user device 114, from an enterprise resource planning (ERP) system, and/or from another source. In general, the instructions can include any information usable to generate the inspection program, such as machine information, object information, an output specification, quality-standard information, combinations of the foregoing and/or the like.

The object information can include, for example, information identifying or describing the object to be inspected via the inspection program. The object can be, for example, a manufactured part like the object 224 of FIG. 2A. In a typical embodiment, the object information includes the GD&T data for the object. The GD&T data can include, or be derived from, models and drawings, such as CAD. In one aspect, the GD&T data can describe distinct geometric features of the object to be inspected (e.g., a size and a nominal geometry) and indicate its corresponding representation, for example, in the CAD models or other data. Generally, each geometric feature refers to a physical portion of the object, such as a surface, pin, tab, hole, slot, or the like. In another aspect, the GD&T data can define engineering tolerances, for example, for individual geometric features of the object (e.g., allowable variation from the nominal geometry).

The machine information can include, for example, information identifying equipment that will execute the inspection program and thereby perform the inspection. In certain embodiments, the machine information can include information sufficient to identify a geometry of specific equipment components as well as movement options, or a range of motion, for components that are movable or adjustable during the inspection. For example, the machine information can relate to a specific inspection machine such as the inspection machine 208, to a specific fixture such as the fixture 222 of FIG. 2A, to a specific tool, such as the tool 218, and/or to a different component usable in conjunction with the inspection.

The output specification can indicate desired output locations for inspection results. The desired output locations can include, for example, machine registers (e.g., CNC machine controller registers that may affect cutting program operation), data fields in reports, and/or the like. In certain embodiments, the output specification can utilize a source-sink format, such that particular resultant values from the inspection are mapped to particular data fields and/or memory locations.

The quality-standard information can define quality standards for individual geometric features of the object to be inspected. For example, one or more quality standards can be defined for each surface of the object, with the quality standard being included in, or otherwise associated with, the CAD models for the object. In an example, a quality standard can specify a minimum number of inspection points for a given surface. In another example, a quality standard can constrain how inspection points are distributed along a given surface. In yet another example, a quality standard can require that all points, or that at least a specified number or proportion of points, be at least a defined distance from an edge of a given surface. Other examples of quality standards will be apparent to one skilled in the art after a detailed review of the present disclosure.

At block 304, the inspection program generator 104 retrieves additional data for the inspection program. In general, the block 304 can include acquiring any of the data mentioned relative to the block 302 that is desirable and not included with the received instructions. For example, the inspection program generator 104 can request and receive the CAD models from the CAD manager 111 of FIG. 1. As another example, if the instructions received at the block 302 identify a particular machine or related equipment, the inspection program generator 104 can retrieve, from the data store 106, machine data for the identified machine or equipment. In some cases, if all desirable information or data is obtained at the block 302, the block 304 can be omitted.

At block 306, the inspection program generator 104 creates standardized data for the object that includes a representation of some or all of the GD&T data. In a typical embodiment, the block 306 can involve the inspection program generator 104 converting external representations of data obtained at the blocks 302 and 304, such as the GD&T data, to internal representations. In such cases, the block 306 can include applying an algorithm that maps and transforms data elements in the external representations to the internal representations, which representations can include an assortment of data structures. In some embodiments, with respect to the GD&T data, the internal representations can conform to a standard such as, for example, ASME Y14.5 published by the American Society of Mechanical Engineers (ASME). In various embodiments, the annotated GD&T data shown in FIG. 2B is an example of some of the standardized data that can result from the block 306.

At block 308, the inspection program generator 104 generates a standard feature set using the standardized data from the block 306. In various cases, the standard feature set can include a listing of geometric features according to an applicable taxonomy and/or standard. In various cases, the standard feature set can indicate each surface of the object to be inspected as well as a classification for the same (e.g., plane, cylindrical surface, etc.). For example, in some embodiments, the standard feature set can be formatted or arranged according to Dimensional Measurement Interface Standard (DMIS). In some embodiments, the features that are included in the standard feature set can be revised via user input or selection, for example, if it is desirable to select or include fewer than all geometric features.

At block 310, the inspection program generator 104 generates inspection directions and inspection points for each surface, or for each of a subset of surfaces, of the object. In general, an inspection point can refer to a geometric position to translate an inspection device, such as the tool 218 of FIG. 2A, for the capture of inspection data. Inspection direction can refer to an orientation of the inspection device to capture the inspection data. In various embodiments, the inspection directions and the inspection points can be generated for each surface identified in the standard feature set. In certain embodiments, the inspection directions can be expressed in unit vector notation in terms of i, j, and k. In general, the inspection points are specified by direction, such that each inspection direction is associated with one or more inspection points. In a typical embodiment, as a result of the block 310, the surfaces of the object are organized, or grouped, by inspection direction. For example, the surfaces can be arranged into groups such that, within each group, each surface can be inspected using the same orientation of a tool similar to the tool 218 of FIG. 2A (i.e., without performing a rotation of such tool to change its orientation). An example of functionality that can be performed at the block 310 will be described relative to FIG. 4.

At block 312, the inspection program generator 104 generates first transitional motions between each pair of surfaces within each group. For example, if a given group includes three surfaces that each have a single inspection direction, the inspection program generator 104 can calculate two sets of transitional motions: (1) a first set of motion(s) to transition from a first direction of a first surface to a second direction of a second surface; and (2) a second set of second motion(s) to transition from the second direction to a third direction of a third surface. In some embodiments, surfaces within the same group do not require a change in orientation of a tool such as the tool 218 of FIG. 2A. In these embodiments, the transitional movements generated at the block 312 may thus exclude rotational movement to change the orientation of such tool. In various embodiments, the block 312 can include specifying start and end positions for a given machine so as to facilitate, for example, transition to and/or from the first and last groups.

At block 314, the inspection program generator 104 generates other, or second, transitional motions such as, for example, transitional motions between groups. In general, the second transitional motions change the orientation of a tool such as the tool 218 of FIG. 2A and therefore involve rotations of such tool. In various embodiments, the blocks 312 and 314 collectively result in a set of transitional motions to inspect all the surfaces according to the inspection directions and inspection points generated at the block 310. At block 316, the inspection program generator 104 standardizes the transitional motions generated at the blocks 312 and 314. For example, in the above-described example using DMIS, the inspection program generator 104 can convert the transitional motions to DMIS representations.

At block 318, the inspection program generator 104 generates standardized tolerances. In some embodiments, the block 318 can involve the inspection program generator 104 scanning the standardized data from the block 306, retrieving tolerance data therein, and converting the tolerance data to a particular format. Continuing the above DMIS example, in some implementations, the block 318 can involve converting the tolerance data to DMIS representations.

At block 320, the inspection program generator 104 writes inspection-program data to a file. The inspection-program data can include, for example, information related to the generated inspection directions and inspection points from the block 310, the standardized transitional motions from the block 316, the standardized tolerances from the block 318, and/or other data. Continuing the above DMIS example, in some implementations, the inspection-program data can be written to a DMIS file.

At block 322, the inspection program generator 104 generates machine-readable code from the file created at the block 320, where the machine-readable code represents the inspection program. The machine-readable code can be any code that is suitable to control a given inspection machine such as, for example, the inspection machine 208 of FIG. 2A. For example, in some implementations, the machine-readable code can be G-code (i.e., RS-274). In some embodiments, such as embodiments in which the given inspection machine can read and interpret existing data such as the file resulting from the block 320, the block 322 may be omitted. In these embodiments, this existing data may be considered machine-readable code such that no additional generation at the block 322 is needed.

At block 324, the inspection program generator 104 simulates the machine-readable code. In a typical embodiment, the block 324 involves testing the machine-readable code to ensure that it does not create collisions. In some embodiments, simulation at the block 324 may be omitted. At block 326, the machine-readable code is stored at a destination. For example, the machine-readable code can be posted to one or more machines that will execute the inspection program. After block 326, the process 300 ends.

Figure 4:
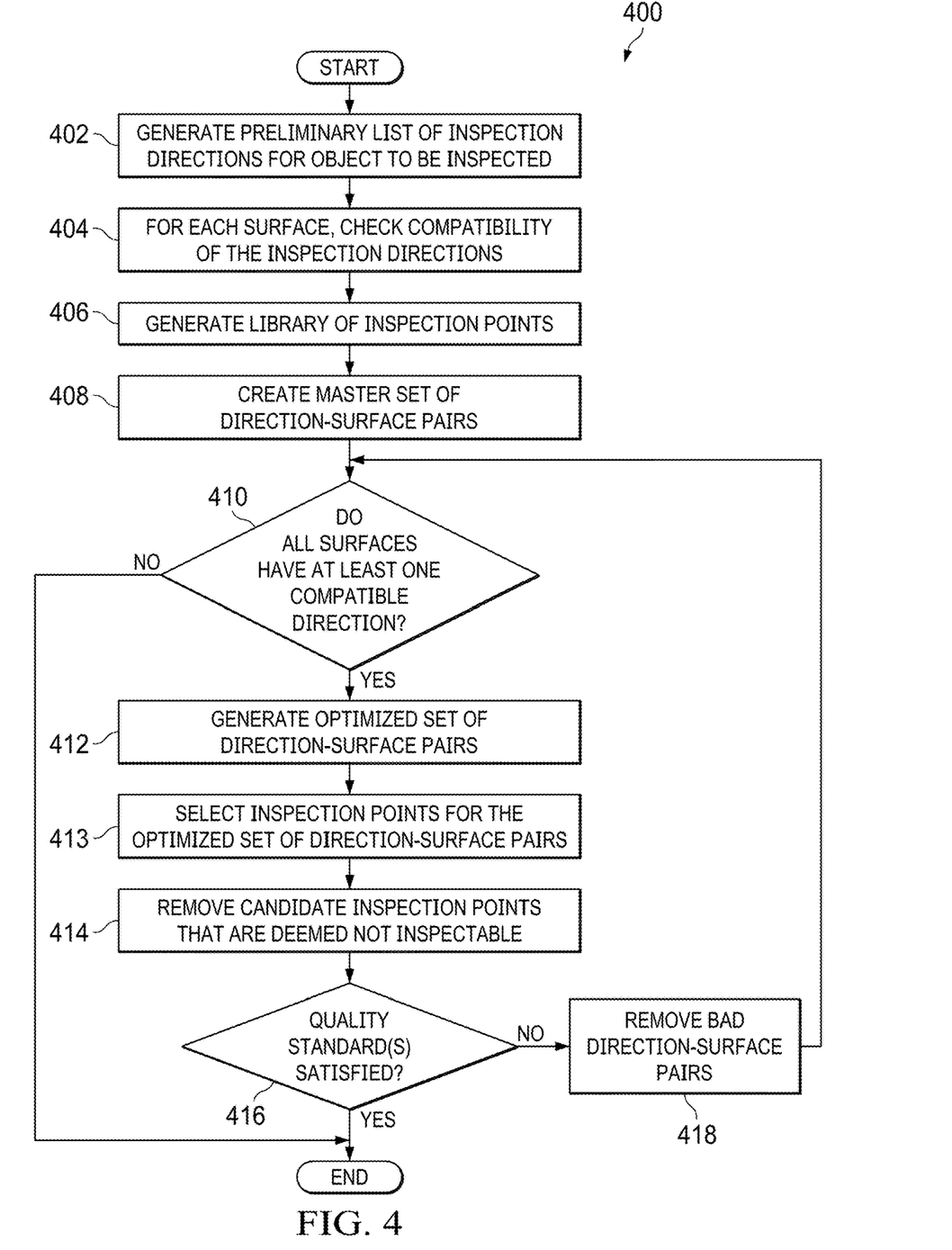
FIG. 4 illustrates an example of a process for automatically generating inspection directions and inspection points.

FIG. 4 illustrates an example of a process 400 for automatically generating inspection directions and inspection points. In certain embodiments, the process 400 can be executed as all or part of the block 310 of FIG. 3. In an example, the process 400 can be executed by the inspection program generator 104 of FIG. 1. In another example, the process 400 can be executed generally by the inspection management system 102 and/or the computing environment 100. Although the process 400 can be executed by any number of different components, to simplify discussion, the process 400 will be described relative to the inspection program generator 104.

At block 402, the inspection program generator 104 generates a preliminary list of inspection directions for an object to be inspected. In certain embodiments, each type of surface can have one or more default inspection directions that are stored in configurations, for example, in the data store 106 of FIG. 1. In an example, the default inspection direction for a plane may be normal to the plane. In another example, the default inspection direction for a surface of a cylinder may be tangent to an axis of the cylinder. In some embodiments, the preliminary list can include a compilation of the default directions for each surface of the object.

At block 404, the inspection program generator 104 checks a compatibility of each inspection direction in the preliminary list with each surface of the object. For example, with reference to FIG. 2A, the inspection program generator 104, or another component in communication with the inspection program generator 104, can determine, for each combination of surface and inspection direction, whether the inspection direction would result in a collision with any portion of the inspection machine 208 in consideration of a geometry of the inspection machine 208 and/or its components such as the fixture 222. In some implementations, a given inspection direction is determined to be compatible with a given surface if the given inspection direction does not result in a collision.

At block 406, the inspection program generator 104 generates a library of inspection points for the object. In some embodiments, the library can represent all possible inspection points for each surface of the object. In other embodiments, the library can represent a sampling of such inspection points.

At block 408, the inspection program generator 104 creates a master set of direction-surface pairs. In a typical embodiment, the master set of direction-surface pairs is created by associating each inspection direction with each surface with which it is deemed compatible. In this way, the master set of direction-surface pairs can identify each such association as a direction-surface pair.

At decision block 410, the inspection program generator 104 determines whether all surfaces of the object to be inspected have at least one compatible inspection direction indicated in the master set. If not, the process 400 ends in failure. Otherwise, if it is determined at the decision block 410 that all surfaces of the object to be inspected have at least one compatible direction, the process 400 proceeds to block 412.

At block 412, the inspection program generator 104 generates an optimized set of direction-surface pairs. In general, the block 412 can serve to reduce the number of direction-surface pairs in a way that ensures all surfaces can still be inspected. In some embodiments, the inspection program generator 104 can represent a result of executing a minimization algorithm, such as a minimal hitting-set algorithm, on the master set of direction-surface pairs.

At block 413, the inspection program generator 104 selects candidate inspection points for each direction-surface pair in the optimized set. For example, the candidate inspection points can be selected from the library of inspection points generated at the block 406. At block 414, the inspection program generator 104 removes, from the candidate inspection points, those points that are deemed not inspectable. In an example, points that are deemed not inspectable can include points that are determined to create collisions, for example, using a similar collision analysis to the one described relative to block 404. In another example, points that are deemed not inspectable can include points that are determined to be unreachable. Other examples of points that are not inspectable will be apparent to one skilled in the art after a detailed review of the present disclosure.

At decision block 416, the inspection program generator 104 determines whether quality standards applicable to the object to be inspected are satisfied by the optimized set of direction-surface pairs and corresponding candidate inspection points. As described previously, the quality standards can require a certain number and/or type of inspection points on a per surface or per tolerance basis and/or on another basis. If it is determined, at the decision block 416, that the applicable quality standards are not satisfied for one or more direction-surface pairs, such direction-surface pairs are removed from the master set at block 418 to yield a revised master set. From block 418, the process 400 returns to decision block 410 and executes as described previously using the revised master set.

If it is determined at the decision block 416 that the applicable quality standards are satisfied for all direction-surface pairs in the optimized set, the process 400 ends in success, with the optimized set of direction-surface pairs and corresponding inspection points being returned by the process 400. With reference to the process 300 of FIG. 3, the optimized set of direction-surface pairs and the corresponding candidate inspection points for such pairs can correspond to the inspection directions and points for each surface that are generated at the block 310.

Figure 5:
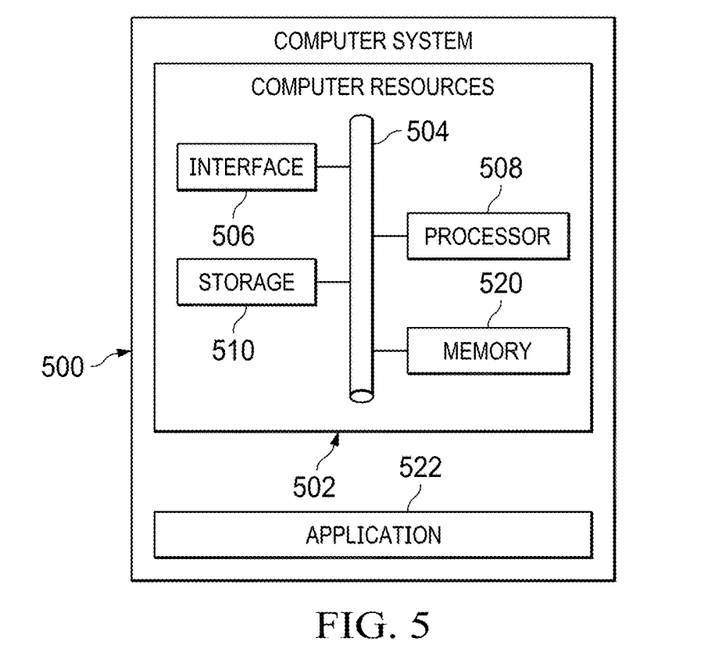
FIG. 5 illustrates an example of a computer system.

FIG. 5 illustrates an example of a computer system 500. In some cases, the computer system 500 can be representative, for example, of the user device 114, the inspection management system 102, the inspection machines 108, the modeling system 110, and/or a component of the foregoing. The computer system 500 includes an application 522 operable to execute on computer resources 502. The application 522 can include, for example, logic for executing functionality of any of the components of the inspection management system 102. In particular embodiments, the computer system 500 may perform one or more actions described or illustrated herein. In particular embodiments, one or more computer systems may provide functionality described or illustrated herein. In particular embodiments, encoded software running on one or more computer systems may perform one or more actions described or illustrated herein or provide functionality described or illustrated herein.

The components of the computer system 500 may include any suitable physical form, configuration, number, type and/or layout. As an example, and not by way of limitation, the computer system 500 may include an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 500 may include one or more computer systems; be unitary or distributed; span multiple locations; span multiple machines; or reside in a cloud, which may include one or more cloud components in one or more networks.

In the depicted embodiment, the computer system 500 includes a processor 508, memory 520, storage 510, interface 506, and bus 504. Although a particular computer system is depicted having a particular number of particular components in a particular arrangement, this disclosure contemplates any suitable computer system having any suitable number of any suitable components in any suitable arrangement.

Processor 508 may be a microprocessor, controller, or any other suitable computing device, resource, or combination of hardware, software and/or encoded logic operable to execute, either alone or in conjunction with other components, (e.g., memory 520), the application 522. Such functionality may include providing various features discussed herein. In particular embodiments, processor 508 may include hardware for executing instructions, such as those making up the application 522. As an example, and not by way of limitation, to execute instructions, processor 508 may retrieve (or fetch) instructions from an internal register, an internal cache, memory 520, or storage 510; decode and execute them; and then write one or more results to an internal register, an internal cache, memory 520, or storage 510.

In particular embodiments, processor 508 may include one or more internal caches for data, instructions, or addresses. This disclosure contemplates processor 508 including any suitable number of any suitable internal caches, where appropriate. As an example, and not by way of limitation, processor 508 may include one or more instruction caches, one or more data caches, and one or more translation lookaside buffers (TLBs). Instructions in the instruction caches may be copies of instructions in memory 520 or storage 510 and the instruction caches may speed up retrieval of those instructions by processor 508. Data in the data caches may be copies of data in memory 520 or storage 510 for instructions executing at processor 508 to operate on; the results of previous instructions executed at processor 508 for access by subsequent instructions executing at processor 508, or for writing to memory 520, or storage 510; or other suitable data. The data caches may speed up read or write operations by processor 508. The TLBs may speed up virtual-address translations for processor 508. In particular embodiments, processor 508 may include one or more internal registers for data, instructions, or addresses. Depending on the embodiment, processor 508 may include any suitable number of any suitable internal registers, where appropriate. Where appropriate, processor 508 may include one or more arithmetic logic units (ALUs); be a multi-core processor; include one or more processors 508; or any other suitable processor.

Memory 520 may be any form of volatile or non-volatile memory including, without limitation, magnetic media, optical media, random access memory (RAM), read-only memory (ROM), flash memory, removable media, or any other suitable local or remote memory component or components. In particular embodiments, memory 520 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 520 may include one or more memories 520, where appropriate. Memory 520 may store any suitable data or information utilized by the computer system 500, including software embedded in a computer readable medium, and/or encoded logic incorporated in hardware or otherwise stored (e.g., firmware). In particular embodiments, memory 520 may include main memory for storing instructions for processor 508 to execute or data for processor 508 to operate on. In particular embodiments, one or more memory management units (MMUs) may reside between processor 508 and memory 520 and facilitate accesses to memory 520 requested by processor 508.

As an example, and not by way of limitation, the computer system 500 may load instructions from storage 510 or another source (such as, for example, another computer system) to memory 520. Processor 508 may then load the instructions from memory 520 to an internal register or internal cache. To execute the instructions, processor 508 may retrieve the instructions from the internal register or internal cache and decode them. During or after execution of the instructions, processor 508 may write one or more results (which may be intermediate or final results) to the internal register or internal cache. Processor 508 may then write one or more of those results to memory 520. In particular embodiments, processor 508 may execute only instructions in one or more internal registers or internal caches or in memory 520 (as opposed to storage 510 or elsewhere) and may operate only on data in one or more internal registers or internal caches or in memory 520 (as opposed to storage 510 or elsewhere).

In particular embodiments, storage 510 may include mass storage for data or instructions. For example, in various embodiments, storage 510 can store all or a portion of the contents of the data store 332 and/or the data store 342, both of FIG. 3. As an example, and not by way of limitation, storage 510 may include a hard disk drive (HDD), a floppy disk drive, flash memory, an optical disc, a magneto-optical disc, magnetic tape, or a Universal Serial Bus (USB) drive or a combination of two or more of these. Storage 510 may include removable or non-removable (or fixed) media, where appropriate. Storage 510 may be internal or external to the computer system 500, where appropriate. In particular embodiments, storage 510 may be non-volatile, solid-state memory. In particular embodiments, storage 510 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 510 may take any suitable physical form and may include any suitable number or type of storage. Storage 510 may include one or more storage control units facilitating communication between processor 508 and storage 510, where appropriate.

In particular embodiments, interface 506 may include hardware, encoded software, or both providing one or more interfaces for communication (such as, for example, packet-based communication) among any networks, any network devices, and/or any other computer systems. As an example, and not by way of limitation, communication interface 506 may include a network interface controller (NIC) or network adapter for communicating with an Ethernet or other wire-based network and/or a wireless NIC (WNIC) or wireless adapter for communicating with a wireless network.

Depending on the embodiment, interface 506 may be any type of interface suitable for any type of network for which computer system 500 is used. As an example, and not by way of limitation, computer system 500 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 500 may include any suitable interface 506 for any one or more of these networks, where appropriate.

In some embodiments, interface 506 may include one or more interfaces for one or more I/O devices. One or more of these I/O devices may enable communication between a person and the computer system 500. As an example, and not by way of limitation, an I/O device may include a keyboard, keypad, microphone, monitor, mouse, printer, scanner, speaker, still camera, stylus, tablet, touchscreen, trackball, video camera, another suitable I/O device, or a combination of two or more of these. An I/O device may include one or more sensors. Particular embodiments may include any suitable type and/or number of I/O devices and any suitable type and/or number of interfaces 506 for them. Where appropriate, interface 506 may include one or more drivers enabling processor 508 to drive one or more of these I/O devices. Interface 506 may include one or more interfaces 506, where appropriate.

Bus 504 may include any combination of hardware, software embedded in a computer readable medium, and/or encoded logic incorporated in hardware or otherwise stored (e.g., firmware) to couple components of the computer system 500 to each other. As an example, and not by way of limitation, bus 504 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 504 may include any number, type, and/or configuration of buses 504, where appropriate. In particular embodiments, one or more buses 504 (which may each include an address bus and a data bus) may couple processor 508 to memory 520. Bus 504 may include one or more memory buses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 508 (such as, for example, one or more internal registers or caches), one or more portions of memory 520, one or more portions of storage 510, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof.

In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language. The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of automatically generating an inspection program, the method comprising, by a computer:
   receiving input data related to an object to be inspected, the input data comprising geometric dimensioning and tolerancing data for the object;
   for each of a plurality of surfaces of the object, generating at least one inspection direction and a plurality of inspection points based, at least in part, on the geometric dimensioning and tolerancing data;
   generating transitional motions for an inspection machine to inspect the plurality of surfaces according to the inspection directions and the inspection points, the plurality of surfaces arranged into a plurality of groups according to inspection direction, the generating transitional motions comprising:
      for each group of the plurality of groups, generating first transitional motions between each pair of surfaces in the group; and
      generating second transitional motions between the groups; and
   storing, at a destination, machine-readable code for inspecting the object according to the at least one inspection direction of each of the plurality of surfaces, the inspection points of each of the plurality of surfaces, and the transitional motions.

2. The method of claim 1, wherein the input data comprises:
   information related to equipment that will execute the inspection program;
   an output specification that indicates desired output locations for inspection results; and
   quality-standard information that defines a quality standard for at least one surface of the object.

3. The method of claim 1, wherein the receiving input data comprises retrieving a computer-aided design (CAD) model of the object, the CAD model comprising at least a portion of the geometric dimensioning and tolerancing data for the object.

4. The method of claim 1, comprising:
creating standardized data for the object, the standardized data including a representation of at least a portion of the geometric dimensioning and tolerancing data; and
generating a feature set for the object using the standardized data, the feature set comprising an identification of the plurality of surfaces of the object; and
wherein the generating the at least one inspection direction and the plurality of inspection points is based, at least in part, on the identification of the plurality of surfaces in the feature set.

5. The method of claim 4, comprising generating standardized tolerances based, at least in part, on the standardized data.

6. The method of claim 5, wherein the generating standardized tolerances comprises:
scanning the standardized data;
retrieving tolerance data from the standardized data; and
converting the tolerance data to a standard format.

7. The method of claim 1, wherein the first transitional motions comprise:
a first set of motions to transition from a first direction of a first surface to a second direction of a second surface; and
a second set of motions to transition from the second direction to a third direction of a third surface.

8. The method of claim 1, wherein the second transitional motions comprise one or more tool rotations.

9. The method of claim 1, comprising standardizing the first and second transitional motions according to a standard representation.

10. The method of claim 1, wherein the storing the machine-readable code comprising posting the machine-readable code to an inspection machine.

11. The method of claim 1, comprising:
writing inspection-program data to a Dimensional Measurement Interface Standard (DMIS) file, wherein the machine-readable code is generated from the file; and
wherein the DMIS file comprises the machine-readable code.

12. The method of claim 1, comprising:
writing inspection-program data to a Dimensional Measurement Interface Standard (DMIS) file; and
automatically generating the machine-readable code from the DMIS file.

13. The method of claim 12, wherein the machine-readable code comprises G-code.

14. The method of claim 1, wherein the inspection machine comprises a contact probe.

15. The method of claim 1, wherein the inspection machine comprises a non-contact probe.

16. A computer system comprising a processor and memory, wherein the processor and memory in combination are operable to implement a method comprising:
receiving input data related to an object to be inspected, the input data comprising geometric dimensioning and tolerancing data for the object;
for each of a plurality of surfaces of the object, generating at least one inspection direction and a plurality of inspection points based, at least in part, on the geometric dimensioning and tolerancing data;
generating transitional motions for an inspection machine to inspect the plurality of surfaces according to the inspection directions and the inspection points, the plurality of surfaces arranged into a plurality of groups according to inspection direction, the generating transitional motions comprising:
for each group of the plurality of groups, generating first transitional motions between each pair of surfaces in the group; and
generating second transitional motions between the groups; and
storing, at a destination, machine-readable code for inspecting the object according to the at least one inspection direction of each of the plurality of surfaces, the inspection points of each of the plurality of surfaces, and the transitional motions.

17. The computer system of claim 16, wherein the input data comprises:
information related to equipment that will execute an inspection program;
an output specification that indicates desired output locations for inspection results; and
quality-standard information that defines a quality standard for at least one surface of the object.

18. The computer system of claim 16, wherein the receiving input data comprises retrieving a computer-aided design (CAD) model of the object, the CAD model comprising at least a portion of the geometric dimensioning and tolerancing data for the object.

19. The computer system of claim 16, the method comprising:
creating standardized data for the object, the standardized data including a representation of at least a portion of the geometric dimensioning and tolerancing data; and
generating a feature set for the object using the standardized data, the feature set comprising an identification of the plurality of surfaces of the object; and
wherein the generating the at least one inspection direction and the plurality of inspection points is based, at least in part, on the identification of the plurality of surfaces in the feature set.

20. A computer-program product comprising a non-transitory computer-usable medium having computer-readable program code embodied therein, the computer-readable program code adapted to be executed to implement a method comprising:
receiving input data related to an object to be inspected, the input data comprising geometric dimensioning and tolerancing data for the object;
for each of a plurality of surfaces of the object, generating at least one inspection direction and a plurality of inspection points based, at least in part, on the geometric dimensioning and tolerancing data;
generating transitional motions for an inspection machine to inspect the plurality of surfaces according to the inspection directions and the inspection points, the plurality of surfaces arranged into a plurality of groups according to inspection direction, the generating transitional motions comprising:
for each group of the plurality of groups, generating first transitional motions between each pair of surfaces in the group; and
generating second transitional motions between the groups; and
storing, at a destination, machine-readable code for inspecting the object according to the at least one inspection direction of each of the plurality of surfaces, the inspection points of each of the plurality of surfaces, and the transitional motions.

* * * * *